May 24, 1949.　　　S. KELLER ET AL　　　2,470,989
FLEXIBLE CONNECTOR
Filed Dec. 16, 1943　　　　　　　　　2 Sheets-Sheet 1
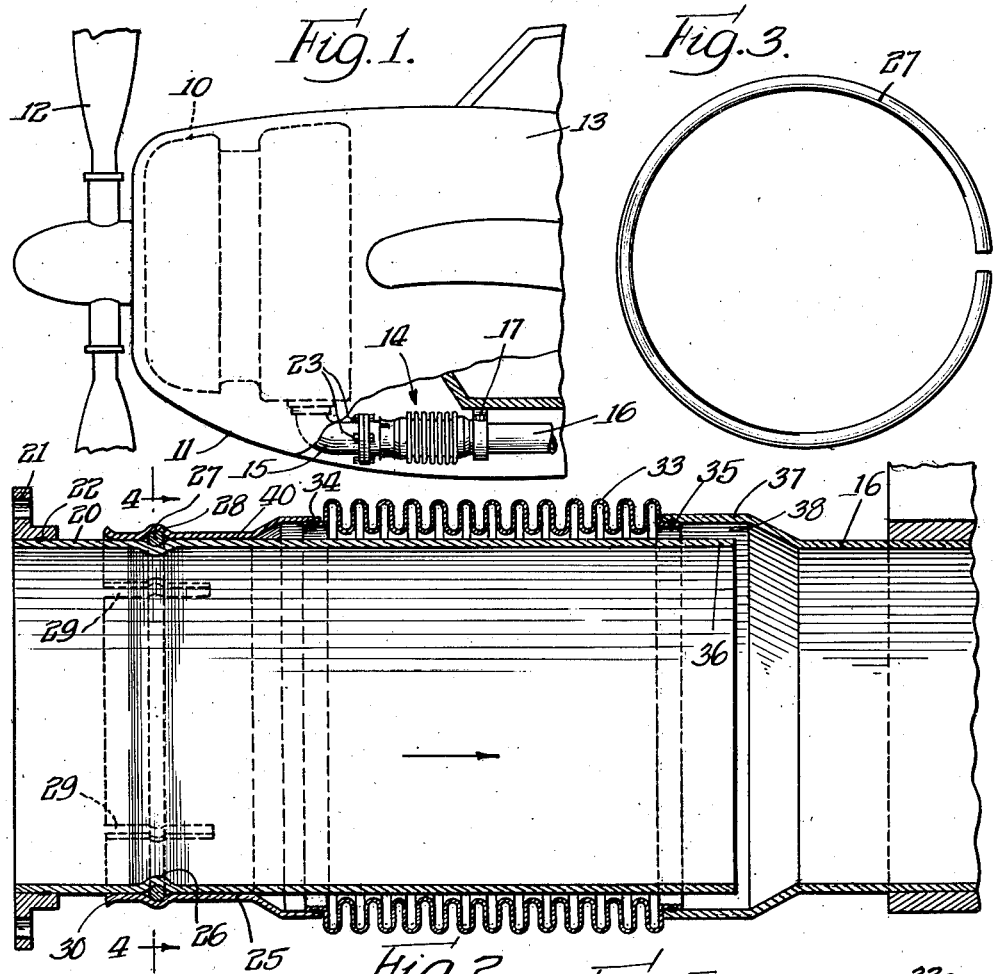
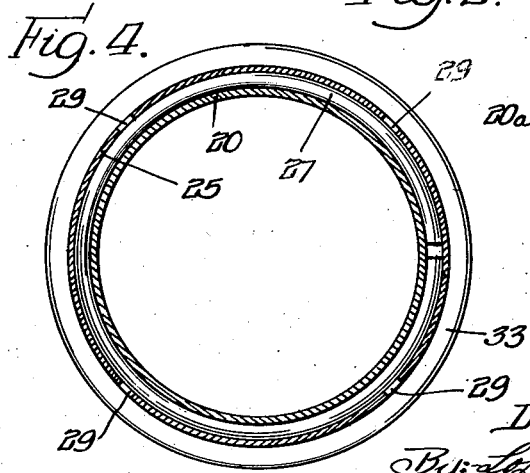
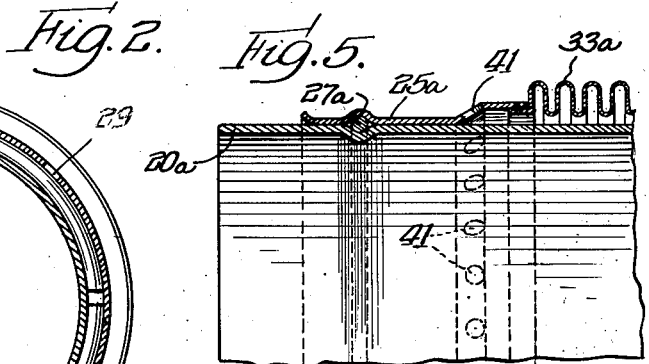
INVENTORS.
Sidney Keller
David Wendell Fentress
By: Loftus, Moore, Olson & Trexler
Attys.

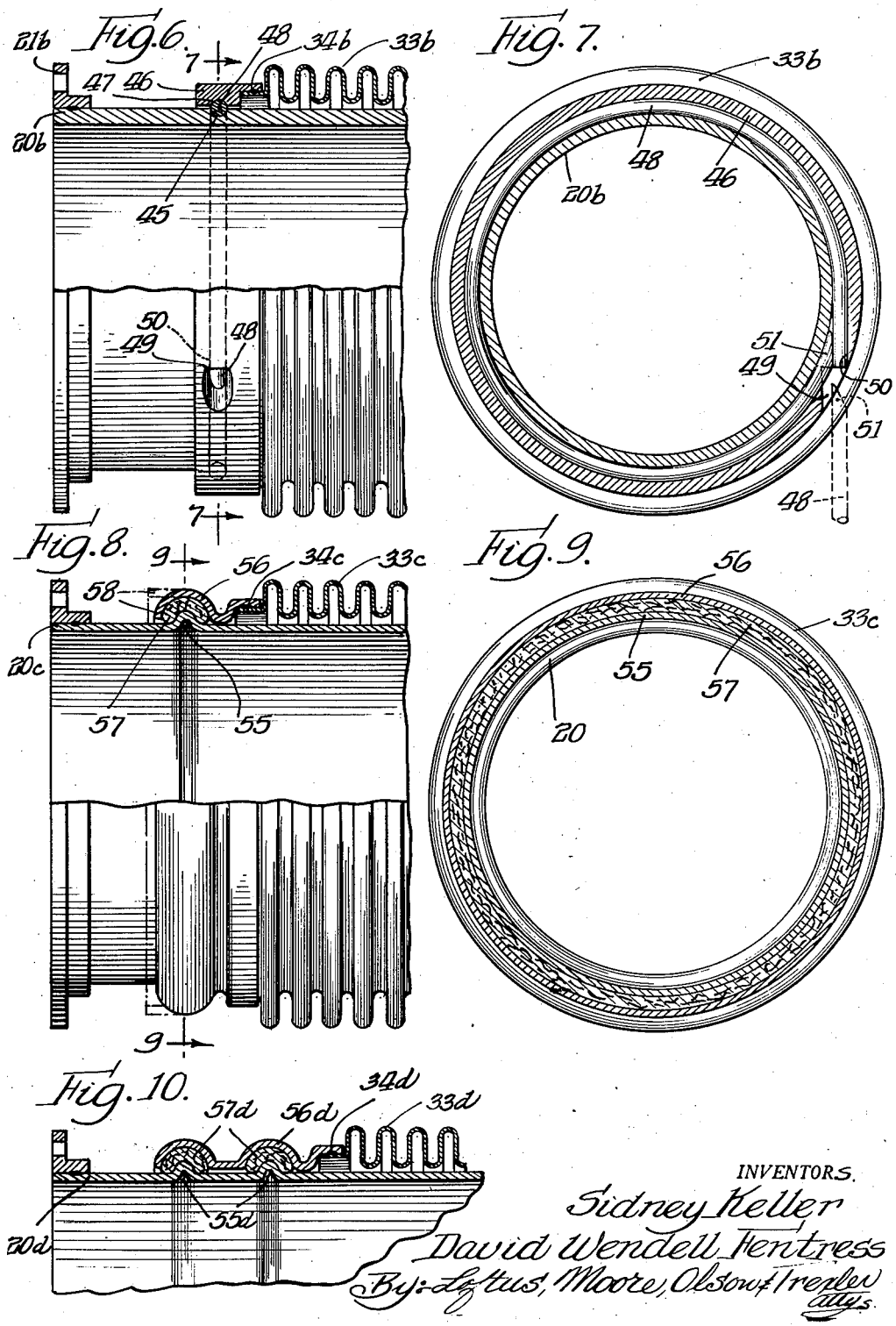

Patented May 24, 1949

2,470,989

UNITED STATES PATENT OFFICE 2,470,989

FLEXIBLE CONNECTOR

Sidney Keller, Park Ridge, and David Wendell Fentress, Barrington, Ill., assignors to Chicago Metal Hose Corporation, Maywood, Ill., a corporation of Illinois Application December 16, 1943, Serial No. 514,482

2 Claims. (Cl. 285—97.3)

This invention relates to flexible connectors for conduits, particularly exhaust conduits for internal combustion engines and the like.

It is an object of the invention to provide an improved flexible connector for conduits.

More specifically stated, it is an object of the invention to provide an improved flexible connector for conduits such as internal combustion engine exhaust conduits and the like which will be durable and substantial in service, and at the same time will absorb all of the motions to which it may be subjected in use, so as not to be distorted or damaged thereby.

A further object of the invention is to provide a conduit structure of the type having a protected flexible tubing incorporated therein, which structure will absorb rotary motion as well as lateral and axial shifting, and bending movements and stresses.

A still further object of the invention is to provide an improved conduit structure, particularly adapted for use as an exhaust conduit for internal combustion engines, which will absorb rotary as well as lateral and axial motions.

Another object of the invention is to provide improved swivel connections in a structure of the type defined.

Various other objects, advantages and features of the invention will be apparent from the following specification when taken in connection with the accompanying drawings, wherein certain preferred embodiments of the invention are set forth for purposes of illustration.

In the drawings wherein like reference numerals refer to like parts throughout,

Fig. 1 is a partial view of an aircraft engine installation embodying a conduit structure constructed in accordance with and embodying the principles of the invention;

Fig. 2 is a detailed view in longitudinal section, and on an enlarged scale, of a portion of the conduit structure shown in Fig. 1, and illustrating the flexible connector features;

Fig. 3 is a detailed view of the ring member, as embodied in the swivel connection of the structure shown in Fig. 2;

Fig. 4 is a transverse sectional view of the structure shown in Fig. 2, and taken as indicated by the line 4—4 thereof;

Fig. 5 is a partial detailed sectional view, illustrating a structure generally similar to that shown in Fig. 2, but incorporating certain modified structural characteristics;

Fig. 6 is a partial longitudinal sectional view showing a flexible connector unit generally similar to that illustrated in Fig. 2, but incorporating a modified form of swivel connection;

Fig. 7 is a transverse sectional view of the structure of Fig. 6, and taken as indicated by the line 7—7 thereof;

Fig. 8 is a partial longitudinal sectional view of a flexible connector structure, also similar to the connector shown in Fig. 2, but embodying a further modified form of swivel connection;

Fig. 9 is a transverse sectional view through the structure of Fig. 8, taken as indicated by the line 9—9 thereof; and Fig. 10 is a partial detailed view of a flexible connector unit and associated swivel connection, generally similar to Fig. 8, but of further modified form.

In the drawings the invention has been shown for purposes of illustration as applied to an exhaust pipe installation for an aircraft internal combustion engine. It is to be understood, however, that the invention may be adapted for other types of conduit installations, including other types of internal combustion engine exhaust structures, for various kinds of vehicles.

The flexible connector shown is of the same general character, and provides an improvement upon the structure illustrated in the copending application of David Wendell Fentress, Serial No. 446,609, filed June 11, 1942, and entitled Flexible connector, now issued as Patent No. 2,337,038, dated December 21, 1943.

Referring more particularly to the drawings and first to the embodiment of the invention illustrated in Figs. 1 to 4, inclusive, the aircraft illustrated comprises an internal combustion engine 10 disposed within a cowling 11, and adapted to operate the propeller 12 at the forward end of the aircraft body or fuselage 13. The flexible connector for the conduit unit comprising the subject matter of the invention is generally indicated by the numeral 14, and as shown, is embodied in the exhaust conduit connections leading from the internal combustion engine. More specifically, the engine 11 is provided with the usual exhaust pipe 15 connected to and forming a part of the engine structure. The exhaust connections also include a tail pipe 16 extending to a desired position of exhaust, and secured to the aircraft body by means of suitable brackets or supports, one of which is illustrated at 17.

In an installation of this character, the engine 10 is generally resiliently mounted upon its support, and during operation partakes in various shifting movements, within limited degrees. In operation, the engine will rotate slightly with respect to its longitudinal axis, and it will also shift laterally, and on occasion also slightly rearwardly or forwardly, thus subjecting the exhaust pipe 15 to rotary as well as bodily shifting movements, both lateral and longitudinal. In view of the fact that the tail pipe 16 is rigidly connected to the aircraft or vehicle body, by means of its supporting brackets, it will be seen that these movements of the exhaust pipe 15 subject the flexible connector 14 to various types of motions, including rotary motions, bending, and lateral and axial bodily shifting. In accordance with the invention, the flexible connector is adapted to absorb all of these motions, while at the same time forming a durable and integral part of the exhaust conduit connections.

Referring more specifically to the flexible connector structure, it will be seen that it comprises a rigid pipe member 20, Figs. 2 and 4, adapted to be rigidly secured to the exhaust pipe 15. Various suitable securing means may be employed, and as illustrated, an end flange member 21 is provided on the end of the pipe 20, and suitably secured thereto, for example, by circular welding as indicated at 22. This end flange is adapted to be secured to a similarly formed flange on the end of the pipe 15 by means such as bolts 23, Fig. 1. The pipe 20 is preferably of suitable exhaust pipe material, for example, carbon steel or the like, and may in an illustrative embodiment have a wall thickness on the order of one-sixteenth of an inch.

A metal band 25 is arranged in encompassing relation to the pipe 20, and is adapted for swivel or rotary movement thereon. Preferably this metal band may be thinner than the pipe 20, inasmuch as it is not in contact with the hot exhaust gases or other fluids being conducted and is not subjected to the deteriorating effects thereof.

To effect the swivel connection between the pipe 20 and the band 25, the pipe is provided with an inwardly projected annular groove, as indicated at 26, into which a metal ring 27, shown in detail in Fig. 3, is adapted to be placed. The metal ring is of sufficient resiliency so that it may be slipped over the end of the pipe 20, and sprung into place within the groove 26, after the groove has been formed on the pipe, for example, by rolling or the like. The band 25 is provided with an outwardly projected annular groove 28, suitably formed therein as by rolling, for cooperation with and swivel connection upon the ring 27. Preferably the proportioning of the parts is such that while the band is adapted for swivel or rotary movement, a relatively snug engagement between the band and the pipe, and between the ring 27 and its cooperating grooves 26 and 28 is provided. To effect an assembly of the parts, it is contemplated that the band 25 may be forced into position over the ring 27, and to this end the band is provided with a plurality of longitudinally projected circumferentially spaced slits 29 extending along a portion of its length, there being four such slits in the particular embodiment illustrated. These slits enable the band to be slipped over the ring, enabling the ring to be brought into seated engagement within the band groove 28. The band is also provided with an outwardly turned end flange portion 30 to facilitate its assembly and swivel operation.

It will be seen that by reason of the connections provided, the band 25, while snugly embracing the pipe 20, is adapted for rotary or swivel movement thereon.

A piece of flexible metal tubing 33 is secured to the end of the band 25 by suitable means, such as by a circular resistance weld 34. Various flexible tubings may be employed, either helically or annularly corrugated, or otherwise formed and embodied to impart the necessary flexibility. For example, helically formed interlocked tubing may be used. But in the particular embodiment shown the flexible tubing 33 is annularly corrugated, longitudinally seamed flexible tubing, preferably formed of stainless steel or like corrosive resistant, and relatively strong material; and relatively thin, for example, on the order of .010 inch or less in wall thickness. Such flexible tubing is possessed of requisite mechanical strength, it is fluid tight, but at the same time is adapted to absorb either axial or transverse shifting movements.

The end of the flexible tubing 33, opposite the band 25, is secured by suitable means such as an annular weld 35 to the tail exhaust pipe member 16, the tubing 33 thus forming a flexible connection between the pipe 16 and the band 25.

The pipe 20 extends through the tubing 33, thus protecting the relatively thin flexible tubing from direct contact with the exhaust gases or other fluids being conducted. The end 36 of the pipe 20 is maintained in spaced relation from the enlarged end portion 37 of the tail pipe 16, thus providing a space 38 between the pipes, whereby they are relatively shiftable within predetermined limits.

In operation, it will be seen that the structure accommodates and absorbs all of the relative movements which may be imparted between the pipes 15 and 16. The flexible tubing 33 absorbs axial and lateral shifting and bending. It will not absorb rotary or torque stresses which may be applied between the pipes 15 and 16, but these are arbsorbed by the swivel connection between the pipe 20 and the band 25. The flexible connection as a whole thus absorbs all motions to which the structure may be subjected, while at the same time the relatively thin flexible tubing is protected from the deteriorating action of the conducted fluids or gases.

It will also be noted that the swivel connection is similarly protected from the deteriorating effects of the conducted gases, in that all the relatively shifting operating parts thereof are disposed exteriorly of the pipe 20, and maintained out of contact with the conducted gases or fluids. This insures that carbon will not be deposited between the relatively shifting parts, nor will the sliding parts become pitted or corroded. This insures that the swivel connection throughout the life of the structure will be maintained in its original condition, and will not become loose, nor will it jam or become irregular and unreliable in operation.

Due to the relatively snug engagement between the band 25 and the pipe 20, along an annular surface, as indicated by the reference numeral 40, Fig. 2, the swivel connection is substantially gas-tight. In certain instances it may be desirable to provide an air inlet into the structure, for the purpose of cooling the convolutions of the flexible tubing 33. Such an arrangement is illustrated in Fig. 5. It will be seen that in this instance the swivel band, indicated by the numeral 25a, is provided with a series of openings 41 through which air may be drawn, passing along the base of the convolutions of the tubing 33, whereby to effect a cooling thereof. It will be understood that the passage of the gases through the pipe 20, in the direction of the arrow, Fig. 2, causes a Venturi suction to be created at the space 38, which in the structure of Fig. 5, will cause the cooling air to be drawn in through the openings 41. Accordingly, notwithstanding the presence of the openings, the exhaust gases do not find their way outwardly through the walls of the structure, but are constrained to pass outwardly in the proper manner through the tail pipe 16.

In Figs. 6 and 7 a modified form of swivel connection is illustrated. In this instance the pipe member corresponding to the pipe 20 previously described, and indicated by the numeral 20b, is provided with a machined annular groove 45, at a position substantially that of the rolled annular groove 26 in the embodiment previously described. An annular band member 46, corresponding generally in function and purpose to the band member 25 previously described, is provided with a machined annular channel 47, the end of the flexible tubing 33b being adapted to be secured to the band by the weld 34b, as in the structure previously set forth.

To swivelly mount the band 46 upon the pipe 20b, means is provided engageable with the machined channels 45 and 47 is the respective members, for connecting them in swivelled relation. As shown in Figs. 6 and 7 this means takes the form of an elongated nail or wire 48 adapted to be driven into position, as shown. More specifically, the band 46 is provided at one point along its periphery with a notch or cut-out 49, a bore 50 extending from this notch into tangential communication with the annular channel 47. By reason of this arrangement the nail or wire 48 may be driven, as indicated by dotted lines in Fig. 7, into position within the annular channel 45—47, whereby to form the swivel connection between the parts. Preferably, if a substantially fluid-tight connection is desired, the end of the wire 48 may be tapered as indicated at 51 so that when the wire has reached home position a complete circumferential body is provided.

As in the case of the swivel connection previously described, the swivel joint provided in Figs. 6 and 7 is protected from direct contact with the exhaust gases or conducted fluids whereby to prevent carbonizing or deterioration of the surfaces of the relatively sliding members. A uniform and durable swivel connection is thus insured, the degree of resistance to movement imparted by the connection remaining constant throughout the life of the unit.

In Figs. 8 and 9 a still further embodiment of swivel connection is provided. In this instance the main pipe member indicated by the numeral 20c and corresponding to the pipe member 20 previously described is provided with a rolled annularly outwardly projected rib 55. A band member 56, corresponding in function and purpose to the band 25 previously described, is adapted to overlie the annular rib 55, a packing member 57 of suitable material being interposed between the rib and the band member. In order to secure the packing in position, the outer end 58 of the band member may be rolled inwardly from its dotted line to its full line position, as indicated in Fig. 8, whereby to form a packed swivel joint or connection between the parts. A swivel connection of the type illustrated in Figs. 8 and 9 may be desired particularly in instances where an absolutely fluid-tight joint is desired. It will be understood that the packing 57 may be of any suitable character, depending upon the requirements of the installation.

In Fig. 10 a modified form of the structure shown in Figs. 8 and 9 is illustrated. In this instance the pipe member 20d is provided with a pair of annular ribs or projections 55d. These annular ribs cooperate with a pair of packing members 57d, and with a band member 56d whereby to form a pair of swivel joints or connections between the parts. By reason of the pair of packed connections, further fluid tightness is insured, and may be desired in a particular installation. However, as pointed out in respect to Fig. 5, lack of fluid tightness in the swivel band, or in its connection with the pipe 20, will normally result only in an inflow rather than an outflow of fluids. Fluid tightness in the swivel connection is thus ordinarily not required.

It will be seen that in the structures of Figs. 8, 9 and 10 as thus previously described, the swivel joint is protected from direct contact with the exhaust gases or fluids, for the reasons previously discussed.

It is obvious that various changes may be made in the specific embodiments set forth for purposes of illustration, without departing from the spirit of the invention. For example, a plurality of flexible tubings 33 may be provided in tandem, if desired to increase the range of permitted flexibility. Accordingly, the invention is not to be limited to the specific embodiments shown and described but only as indicated in the following claims.

The invention is hereby claimed as follows:

1. A conduit comprising a pair of conduit members arranged in longitudinal continuation, and swivel means for connecting said conduit members for rotary motion relative to each other, said swivel means comprising a pair of concentrically disposed outer and inner band members, said band members being provided with registering inwardly and outwardly directed annular grooves whereby to provide an annular recess between the band members, and an annular ring member disposed within said recess whereby to form a swivel connection between said band members, one of said band members being provided with at least one longitudinally extending slit to facilitate the assembly of the band members with respect to the ring member.

2. A conduit comprising a pair of conduit members arranged in longitudinal continuation, and means for connecting said conduit members for motion relative to each other, said means including a section of flexible tubing connected at one end to one of said conduit members, a band member connected to the other end of said flexible tubing and arranged in telescoped relation to the other of said conduit members, said band member and the said other conduit member being relatively shaped and complementing each other to provide a recess in the overlapping portion, and means engaged in said recess to provide a swivel connection resisting relative longitudinal movement therebetween.

SIDNEY KELLER.
DAVID WENDELL FENTRESS.

REFERENCES CITED

The following references are of record in the file of this patent:

UNITED STATES PATENTS

| Number | Name | Date |
|---|---|---|
| 1,464,386 | Ingram | Aug. 7, 1923 |
| 2,278,152 | Semar | Mar. 31, 1942 |
| 2,310,490 | Melsom | Feb. 9, 1943 |
| 2,381,432 | Bratton | Aug. 7, 1945 |

FOREIGN PATENTS

| Number | Country | Date |
|---|---|---|
| 55,535 | Sweden | Sept. 5, 1921 |
| 831,980 | France | Feb. 19, 1937 |